(12) United States Patent
van Klooster et al.

(10) Patent No.: US 9,429,465 B2
(45) Date of Patent: Aug. 30, 2016

(54) UNIT CONSISTING OF AN ULTRASONIC TRANSDUCER AND A TRANSDUCER HOLDER

(71) Applicant: Krohne AG, Basel (CH)

(72) Inventors: Jeroen Martin van Klooster, Tiel (NL); Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 238 days.

(21) Appl. No.: 14/165,966

(22) Filed: Jan. 28, 2014

(65) Prior Publication Data

US 2014/0208854 A1   Jul. 31, 2014

(30) Foreign Application Priority Data

Jan. 28, 2013 (DE) .................. 10 2013 001 352

(51) Int. Cl.
| | | |
|---|---|---|
| *G01H 3/00* | (2006.01) | |
| *G01F 1/66* | (2006.01) | |
| *G01F 15/18* | (2006.01) | |

(52) U.S. Cl.
CPC ............. *G01H 3/00* (2013.01); *G01F 1/662* (2013.01); *G01F 15/18* (2013.01)

(58) Field of Classification Search
CPC ......... G01H 3/00; G01F 1/662; G01F 1/667; G01F 1/20; G01F 1/66; G01F 15/18
USPC .......... 73/632, 649, 644; 367/140, 165, 172, 367/173, 188; 310/342, 326, 327, 334, 336, 310/338
See application file for complete search history.

(56) References Cited

U.S. PATENT DOCUMENTS

| | | | | |
|---|---|---|---|---|
| 3,752,620 A | * | 8/1973 | Renoux ................... | B29C 43/02 425/174.2 |
| 3,771,117 A | * | 11/1973 | Shaffer et al. .......... | G01F 1/662 310/327 |
| 5,143,898 A | * | 9/1992 | Takano et al. .......... | C04B 35/45 257/E39.018 |
| 5,807,048 A | * | 9/1998 | d'Agraives et al. .. | F16B 41/005 411/14 |
| 6,799,475 B2 | * | 10/2004 | van Klooster .......... | G01F 1/662 73/861.24 |
| 7,973,453 B2 | | 7/2011 | van Klooster | |
| 2009/0314575 A1 | * | 12/2009 | Reiche ................... | G10K 9/122 181/148 |
| 2013/0219707 A1 | * | 8/2013 | Sui et al. ................ | G01F 1/662 29/729 |

FOREIGN PATENT DOCUMENTS

| | | |
|---|---|---|
| DE | 4443415 A1 | 6/1996 |
| DE | 19601570 A1 | 7/1997 |
| DE | 198 12 458 A1 | 10/1999 |
| DE | 10 2008 033 098 A1 | 1/2010 |
| EP | 1 046 886 A1 | 10/2000 |
| EP | 2 148 322 A2 | 1/2010 |
| JP | 2001159551 A | 6/2001 |
| JP | 2012007975 A | 1/2012 |

* cited by examiner

*Primary Examiner* — Helen Kwok
(74) *Attorney, Agent, or Firm* — David S. Safran

(57) ABSTRACT

An ultrasonic transducer and a transducer holder for preventing the transmission of housing waves has a decoupling ring between a housing flange of a transducer housing and a holder flange of the transducer holder. Preferably, there is a gasket between the housing flange of the transducer housing and the decoupling ring in addition to a gasket between the decoupling ring and the holder flange of the transducer holder.

4 Claims, 3 Drawing Sheets

UNIT CONSISTING OF AN ULTRASONIC TRANSDUCER AND A TRANSDUCER HOLDER

BACKGROUND OF THE INVENTION

1 Field of the Invention

The invention relates to a unit comprised of an ultrasonic transducer and a transducer holder, the ultrasonic transducer having a transducer housing and a transducer element, the transducer housing having an ultrasound window, a housing tube and a housing flange, the transducer element being made for sending or receiving ultrasonic waves and being provided either near the ultrasound window of the transducer housing or away from the ultrasound window of the transducer housing, the transducer holder having a holder flange and the housing flange of the transducer housing being tensioned against the holder flange of the transducer holder using an opposing flange with a gasket connected in between.

2. Description of Related Art

Measurement, control and automation engineering are of special importance in industry. This applies especially to measurement engineering which is the basis for control and automation engineering. One important area of measurement engineering is flow rate measurement engineering (see, the comprehensive treatment of Pr. Dr. sc. nat. Otto Fiedler "Flow and Flow Rate Measurement Engineering", R. Oldenbourg Verlag Munich 101992). Flow rate measurement according to mechanical action principles, especially variable-area flow meters and coriolis flow meters, thermal flow meters, magnetic-inductive flow meters and ultrasonic flow meters are of special importance for flow rate measurement engineering (see, "Flow and Flow Rate Measurement Engineering" op. cit.).

In ultrasonic flow meters, the effect is used in a medium transported in a measurement tube that the transport velocity of the medium is superimposed on the propagation velocity of the acoustic signal. The measured propagation velocity of the acoustic signal relative to the measurement tube is therefore greater than in a quiescent medium when the medium is being transported in the direction of the acoustic signal, and the velocity of the acoustic signal relative to the measurement tube is smaller than in the quiescent medium when the medium is being transported opposite the direction of the acoustic signal. The propagation time of the acoustic signal between the acoustic sender and the acoustic receiver—acoustic senders and acoustic receivers are ultrasonic transducers—based on the entrainment effect is dependent on the transport velocity of the medium relative to the measurement tube and thus relative to the ultrasonic transducer, therefore relative to the acoustic sender and the acoustic receiver.

The problem in ultrasonic flow meters is that the ultrasonic waves generated in the ultrasonic transducer or the ultrasonic waves received by the ultrasonic transducer are transmitted not only from the sending and/or receiving side of the transducer housing into the surrounding medium of the ultrasonic transducer, that the transmitted or received ultrasonic waves are also transmitted via the transducer housing, optionally also via a housing holder. This is problematic not only because under certain circumstances a major part of the transmitted power or received power is thus lost, but rather it is mainly problematic because the ultrasonic waves transmitted by so-called crosstalk to the transducer housing can also lead to considerable reception-side interference. This is due to the fact that, for example, it cannot be distinguished whether the received ultrasonic waves have been received via the medium—useful signal—or via the transducer housing.

In particular, in the use of ultrasonic flow meters for measuring the flow rate of gaseous media, the portion of the oscillation energy which has been transmitted from the ultrasonic transducer into the gaseous medium is very small as compared to the oscillation energy generated altogether, so that the problem of crosstalk is especially serious here.

In the prior art, various measures are known to reduce the above explained crosstalk, therefore the formation of housing waves. Some measures relate to the task of preventing the formation of these housing waves. They include, for example, certain configurations of the ultrasound window of the transducer housing with respect to especially good impedance matching for maximizing the transmitted energy portion or with respect to a design of an ultrasound window as a $\lambda/4$ layer to reduce reflections. Other measures relate to preventing housing waves which have already formed from being relayed, for example, by mismatched acoustic impedance transitions.

Ultrasonic transducers of the type of unit under consideration are disclosed in German patent disclosure document 10 2008 033 098 and corresponding European patent disclosure document 2 148 322 as well as counterpart U.S. Pat. No. 7,973,453 B2. In these ultrasonic transducers, another measure for preventing the transmission of housing waves to the transducer housing of the ultrasonic transducer is implemented by there being a relatively soft mechanical coupling system in the second region of the transducer housing and the coupling system having at least two weakly coupled mechanical resonators which are active in the propagation direction of the housing waves essentially in succession.

The mechanical resonators, first of all, make it possible to locally "catch" the energy which has been transported by the ultrasonic waves, specifically by excitation of the mechanical resonators to oscillations. Mechanical resonators can be conventionally described as spring-mass systems, and for real spring-mass systems the property of the spring—specifically, a deflection-dependent force action, cannot be implemented without contributing an amount, even if very small, to the mass of the resonator, exactly like a mass, due to its mechanical incorporation into the resonator, it always influences the spring property of the spring-mass system; the spring and mass cannot be completely separated from one another structurally.

The serial arrangement of the at least two mechanical resonators in the propagation direction of the housing waves results in that the housing waves must traverse all resonators in order to travel from the first region of the transducer housing to the third region of the transducer housing and vice versa. The weak coupling of the two resonators results in that the resonators altogether constitute a greater barrier to the housing waves than is the case for strongly coupled resonators, even if they inherently have otherwise the same oscillation properties. For strong mechanical coupling, the oscillation of one resonator is transmitted essentially directly to the adjacent resonator; this is not the case for weak mechanical coupling even if here, of course, there is also a mechanical interaction between the adjacent resonators.

SUMMARY OF THE INVENTION

The primary object of the present invention is to improve the initially described unit formed of an ultrasonic transducer and a transducer holder with respect to preventing the transmission of housing waves.

The unit in accordance with the invention in which the aforementioned object is achieved is characterized, first of all, essentially in that there is a decoupling ring between the housing flange of the transducer housing and the holder flange of the transducer holder. Preferably, there is a gasket between the housing flange of the transducer housing and the decoupling ring.

In the described unit in accordance with the invention formed of an ultrasonic transducer and a transducer holder, the transmission of housing waves, as compared to units of the type under consideration which are known in the prior art, is improved by the additionally provided decoupling ring and the other gasket which is further additionally provided leading to an acoustic mismatch.

The unit in accordance with the invention acquires major practical importance in addition when the decoupling ring is indirectly connected to the housing flange of the transducer housing. For indirect connection of the decoupling ring to the housing flange of the transducer housing, there is a slide ring which is connected securely to the decoupling ring, for example, welded or screwed to it.

In particular, there are various possibilities at this point for configuring and developing the unit in accordance with the invention. In this regard reference is made to the following exemplary embodiment which which is described below in conjunction with the accompanying figures of the drawings.

DETAILED DESCRIPTION OF THE INVENTION

Figure 1:
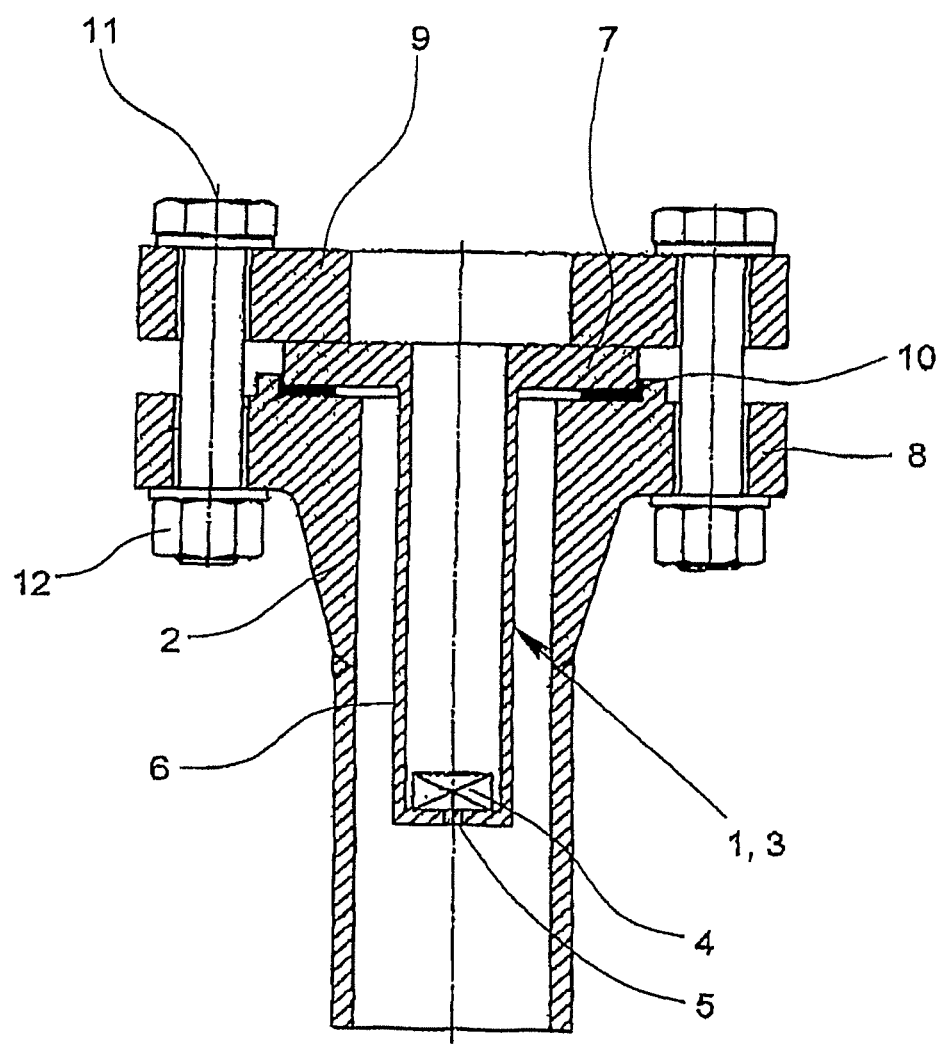
FIG. 1 shows a unit known from the prior art having an ultrasonic transducer and a transducer holder.

FIG. 1 shows a unit known from the prior art having an ultrasonic transducer 1 and a transducer holder 2. The ultrasonic transducer 1 has a transducer housing 3 and a transducer element 4. The transducer housing 3 has an ultrasound window 5, a housing tube 6 and a housing flange 7. The transducer element 4 is made for sending or receiving ultrasonic waves and is either, as the figures show, near the ultrasound window 5 of the transducer housing or away from the ultrasound window of the transducer housing, as shown, for example, by the German patent 198 12 458 and the European patent 1 046 886 of the same content.

Figure 2:
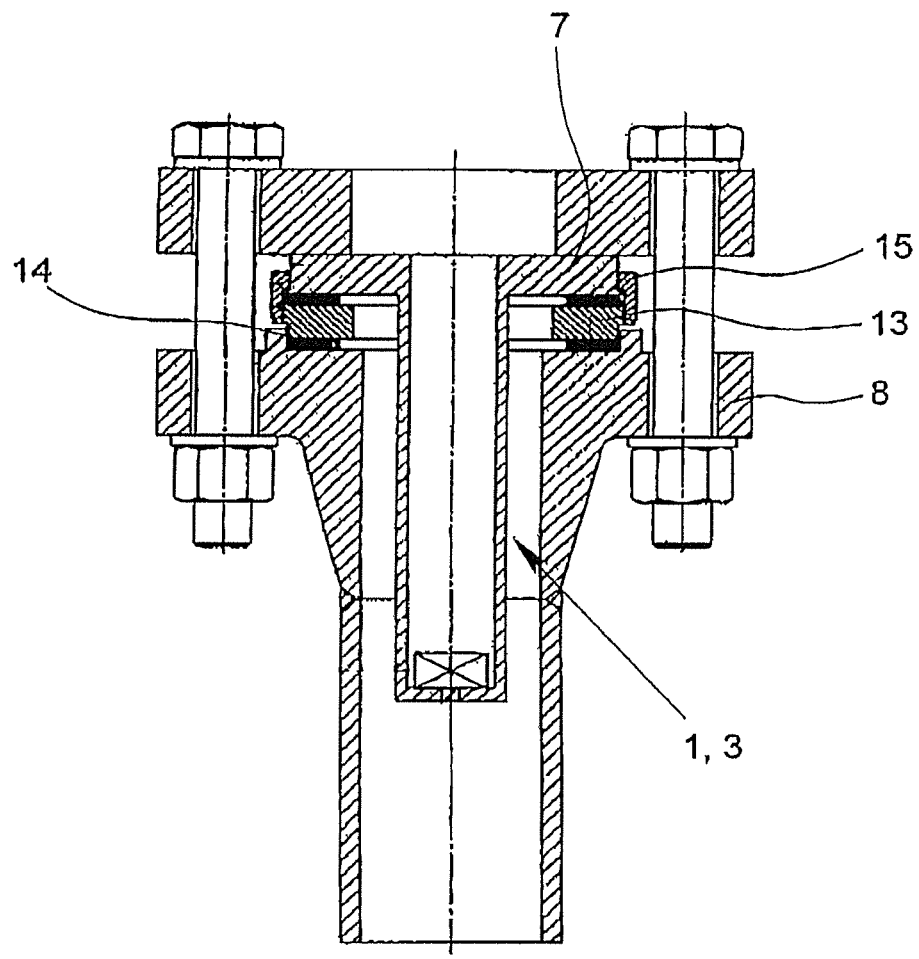
FIG. 2 shows an exemplary preferred embodiment of a unit in accordance with the invention having an ultrasonic transducer and a transducer holder.
Figure 3:
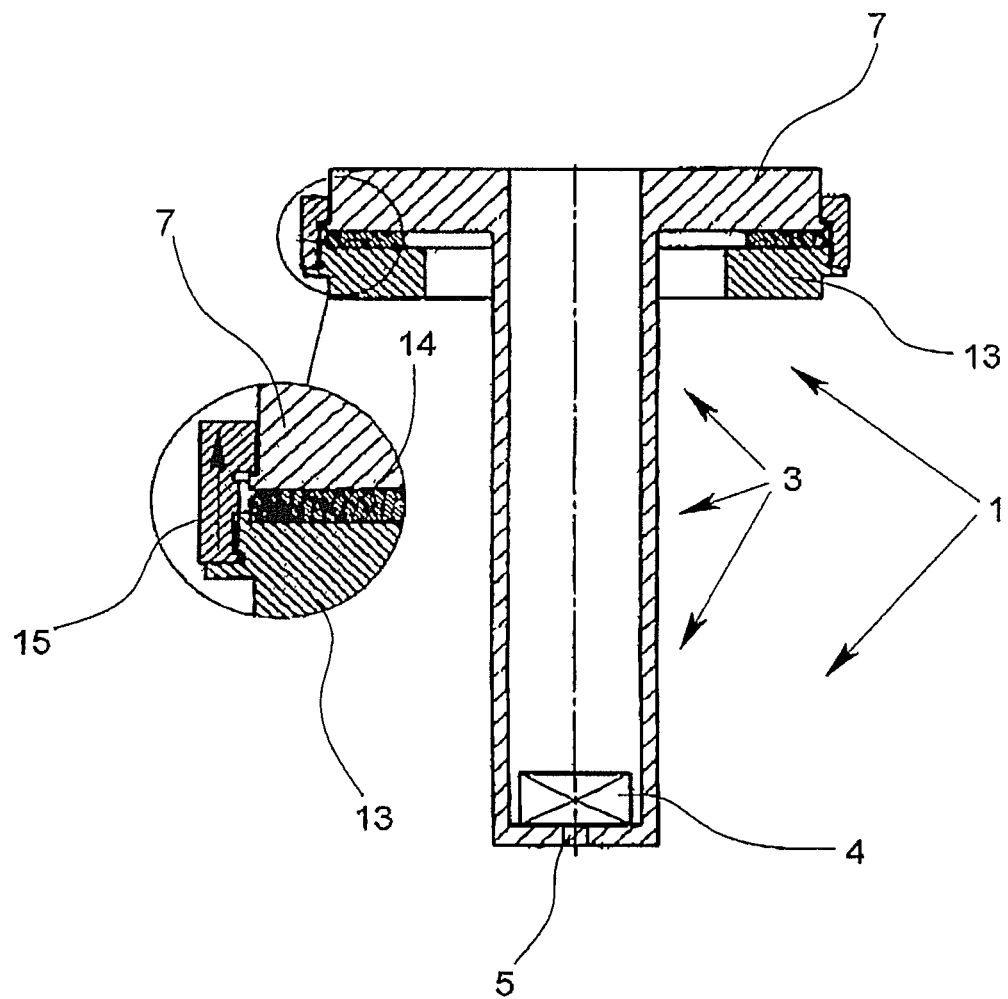
FIG. 3 shows an ultrasonic transducer which of the unit in accordance with the invention as shown in FIG. 2 with a decoupling ring provided in accordance with the invention and another gasket which is preferably present.

Both the prior art unit which is shown in FIG. 1 and the unit in accordance with the invention which is shown in FIG. 2 have a transducer holder 2 that has a holder flange 8 that is tensioned by a gasket 10 being connected between the housing flange 7 of the transducer housing 3 and the holder flange 8 of the transducer holder 2 using straining screws 11 and lock nuts 12 that connect the holder flange 8 to an opposing flange disk 9.

As is shown in FIG. 2, in accordance with the invention, there is a decoupling ring 13 between the housing flange 7 of the transducer housing 3 and the holder flange 8 of the transducer housing 2. In the illustrated embodiment, there is in addition a second gasket 14 between the housing flange 7 of the transducer housing 3 and the decoupling ring 13.

It furthermore applies to the exemplary embodiment of a unit in accordance with the invention which is shown in FIG. 2 that the decoupling ring 13 is indirectly connected to the housing flange 7 of the transducer housing 3. In particular, for indirect connection of the decoupling ring 13 to the housing flange 7 of the transducer housing there is a slide ring 15 which is connected securely to the decoupling ring 13, for example, welded or screwed to it.

In the described preferred embodiment of a unit in accordance with the invention which is shown in FIG. 2, the ultrasonic transducer 1 with the decoupling ring 13, with the gasket 14 and with the slide ring 15 can be inserted into a transducer holder like an ultrasonic transducer which belongs to the prior art.

What is claimed is:

1. A unit, comprising:
an ultrasonic transducer and
a transducer holder,
the ultrasonic transducer having a transducer housing and a transducer element,
the transducer housing having an ultrasound window, a housing tube and a housing flange,
the transducer element being made for sending or receiving ultrasonic waves and being provided either near the ultrasound window of the transducer housing or away from the ultrasound window of the transducer housing,
the transducer holder having a holder flange,
wherein in the housing flange of the transducer housing is tensioned against the holder flange of the transducer holder,
wherein a decoupling ring is located between the housing flange of the transducer housing and the holder flange of the transducer holder and
wherein a gasket is located between the decoupling ring and the holder flange of the transducer holder.

2. The unit in accordance with claim 1, wherein the decoupling ring is indirectly connected to the housing flange of the transducer housing.

3. The unit in accordance with claim 2, wherein the indirect connection of the decoupling ring to the housing flange of the transducer housing comprises a slide ring that is joined to the decoupling ring by a fixed connection.

4. The unit in accordance with claim 3, wherein the fixed connection is one of a welded connection and a screw connection.

* * * * *